(12) United States Patent
Haller et al.

(10) Patent No.: US 8,960,691 B2
(45) Date of Patent: Feb. 24, 2015

(54) APPARATUS AND METHOD FOR DAMPER ADJUSTMENTS FOR A HORIZONTAL SUSPENSION

(75) Inventors: Erwin Haller, Birgland (DE); Jens Kolb, Königstein (DE)

(73) Assignee: Grammer AG, Amberg (DE)

( * ) Notice: Subject to any disclaimer, the term of this patent is extended or adjusted under 35 U.S.C. 154(b) by 152 days.

(21) Appl. No.: 13/411,016

(22) Filed: Mar. 2, 2012

(65) Prior Publication Data

US 2012/0222928 A1     Sep. 6, 2012

(30) Foreign Application Priority Data

Mar. 4, 2011   (DE) .......................... 10 2011 013 122

(51) Int. Cl.
    *B60S 9/00*     (2006.01)
(52) U.S. Cl.
    USPC ..................................................... 280/6.153
(58) Field of Classification Search
    USPC .............. 280/6.153, 6.154; 180/89.12, 89.13, 180/89.14; 248/609, 632, 634; 296/190.04, 296/190.05, 35.1
    See application file for complete search history.

(56) References Cited

U.S. PATENT DOCUMENTS

| | | | |
|---|---|---|---|
| 3,716,213 A | 2/1973 | Lacey | |
| 5,358,305 A | 10/1994 | Kaneko et al. | |
| 5,758,859 A | 6/1998 | Gonzalez | |
| 6,374,935 B1 * | 4/2002 | Kirschenmann et al. | .. 180/89.12 |

FOREIGN PATENT DOCUMENTS

| | | |
|---|---|---|
| DE | 69408953 | 9/1998 |
| DE | 10134715 | 2/2003 |
| DE | 102008052960 | 4/2010 |
| DE | 102008063812 | 6/2010 |
| DE | 102011009530 | 7/2012 |
| JP | 9150660 | 10/1997 |
| JP | 2003104150 | 9/2003 |
| WO | 2007058572 | 5/2007 |
| WO | 2009084856 | 7/2009 |
| WO | 2010032971 | 3/2010 |

* cited by examiner

*Primary Examiner* — Faye M. Fleming
(74) *Attorney, Agent, or Firm* — Lowe Graham Jones PLLC

(57) ABSTRACT

The invention relates to a vehicle oscillation device having two vehicle parts arranged to be movable relative to each other, wherein one of the two vehicle parts is supported in a substantially horizontally oscillatory manner in relation to the further one of the two vehicle parts in the longitudinal direction of the vehicle and/or in the width direction of the vehicle, wherein said two vehicle parts are coupled with each other in an pivoting manner by a transmission system having more than one transmission element, and a damper is provided in a damping manner between a first transmission element and one of the two vehicle parts or a further transmission element.

12 Claims, 9 Drawing Sheets

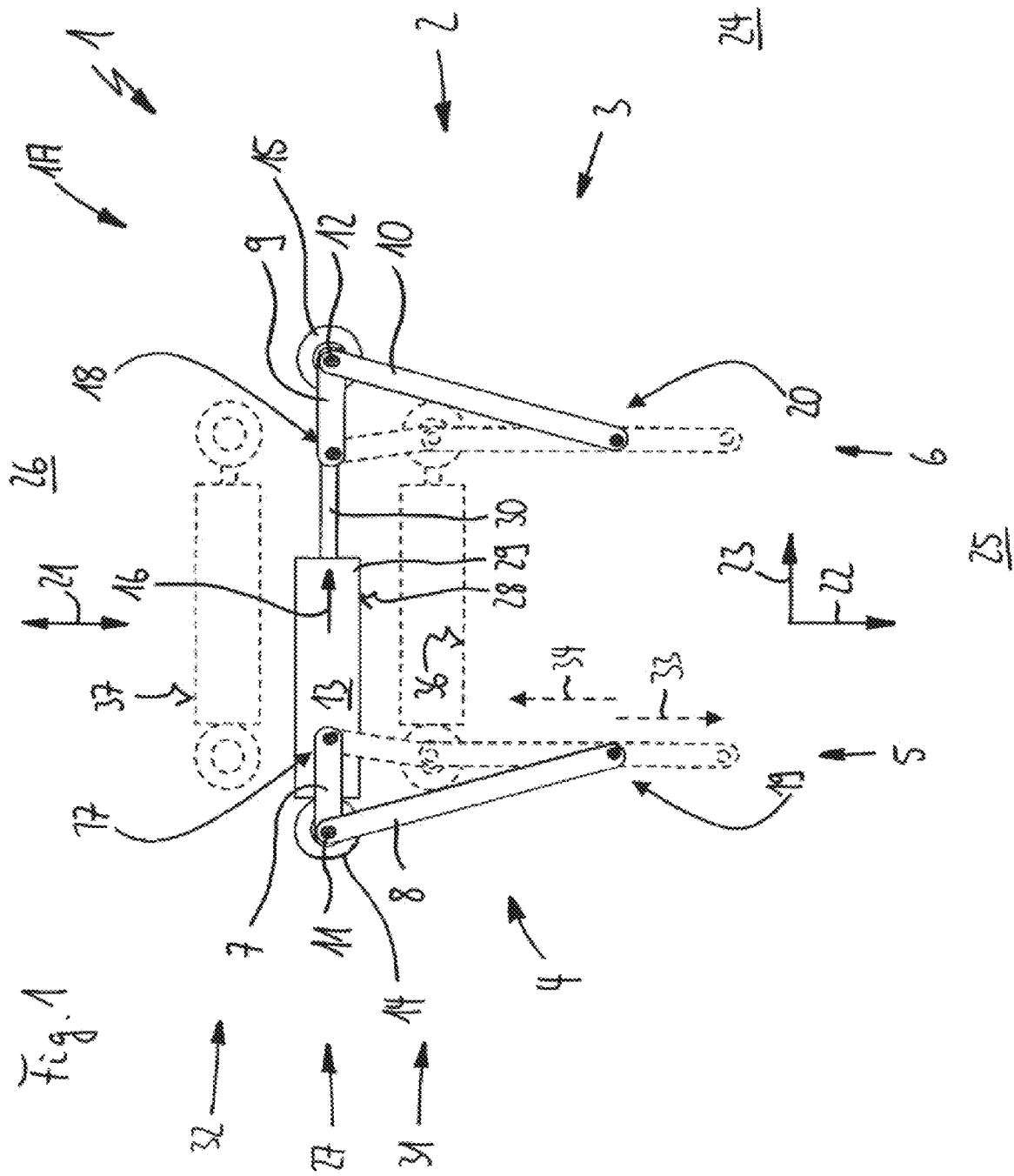

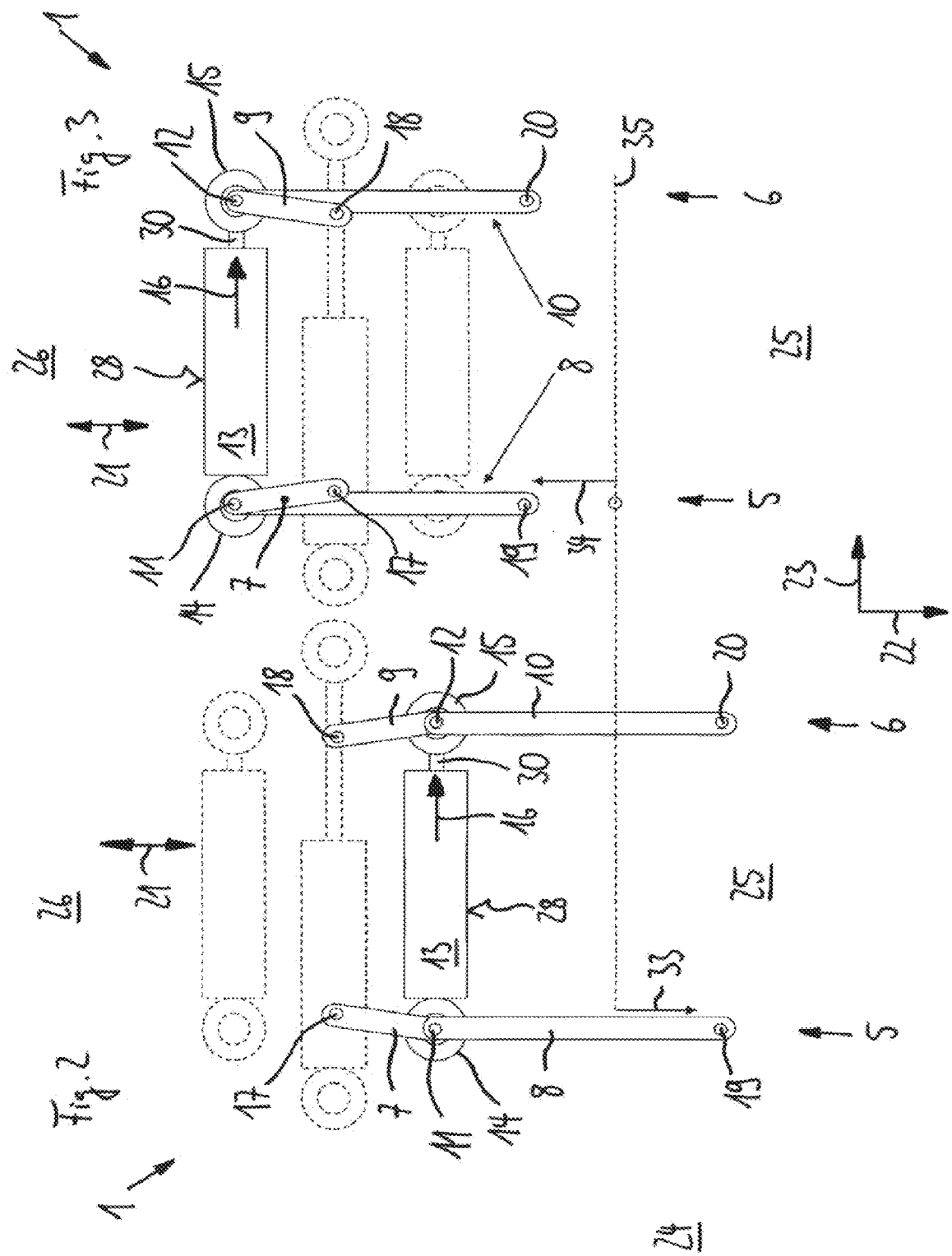

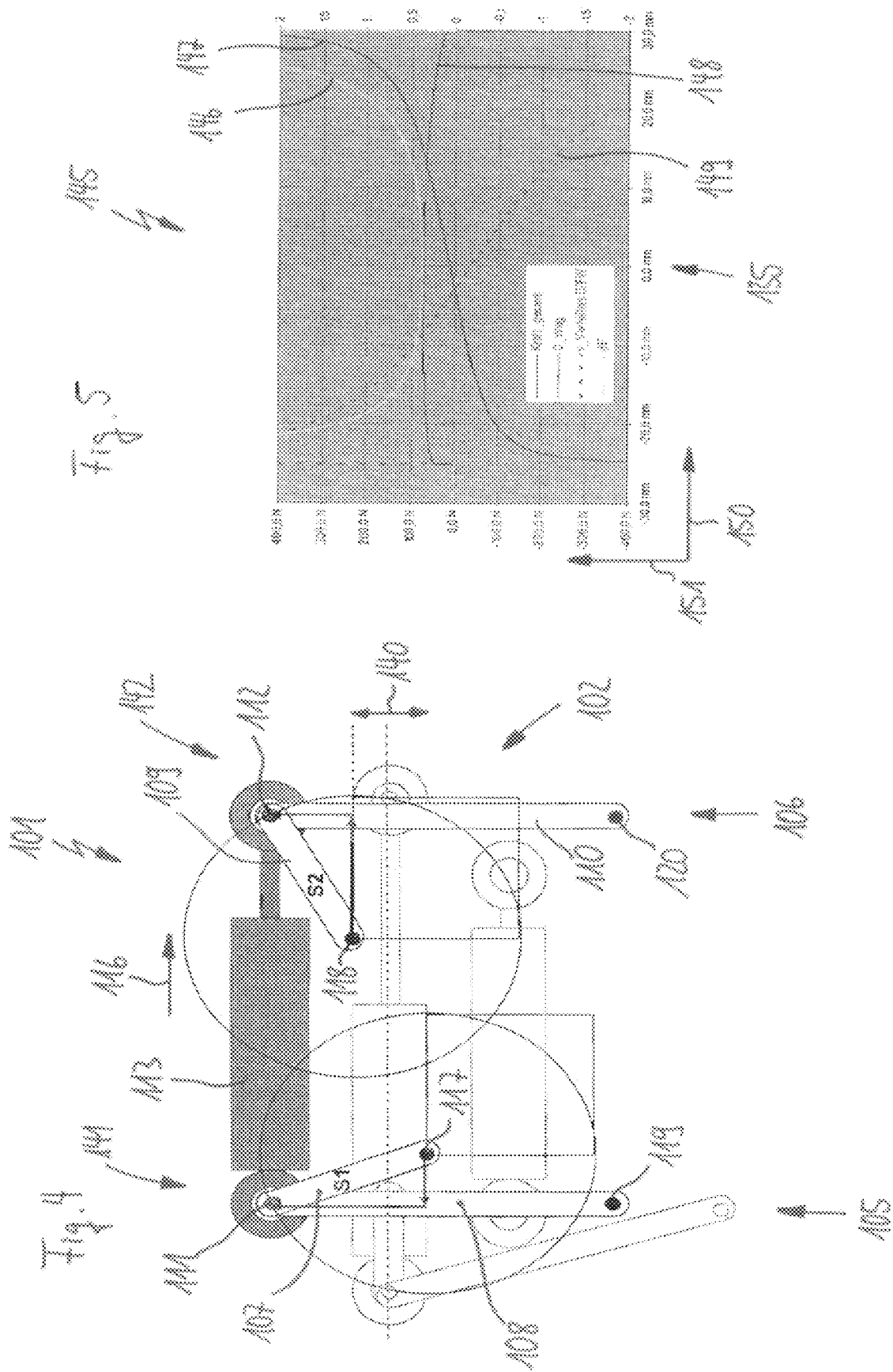

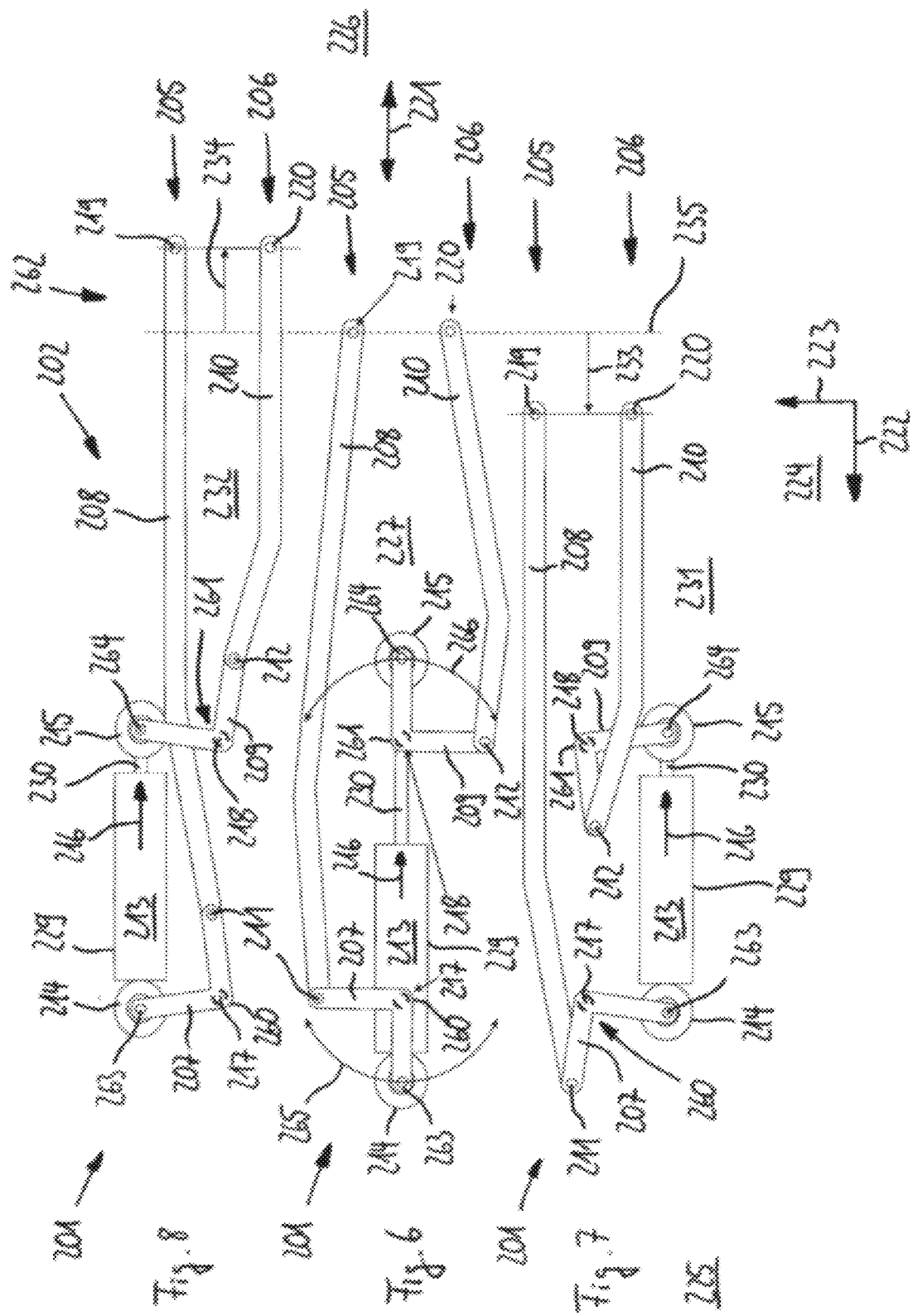

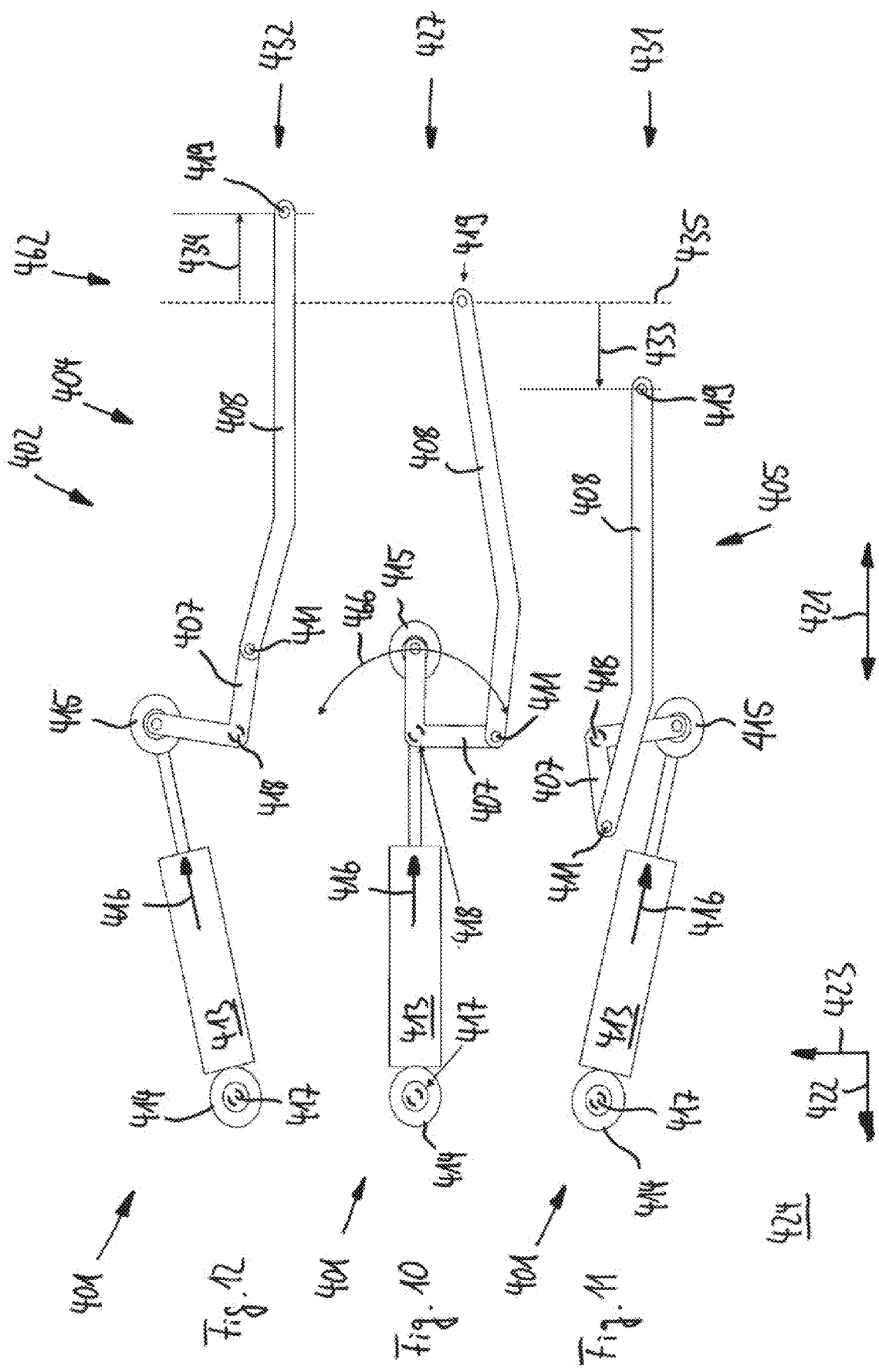

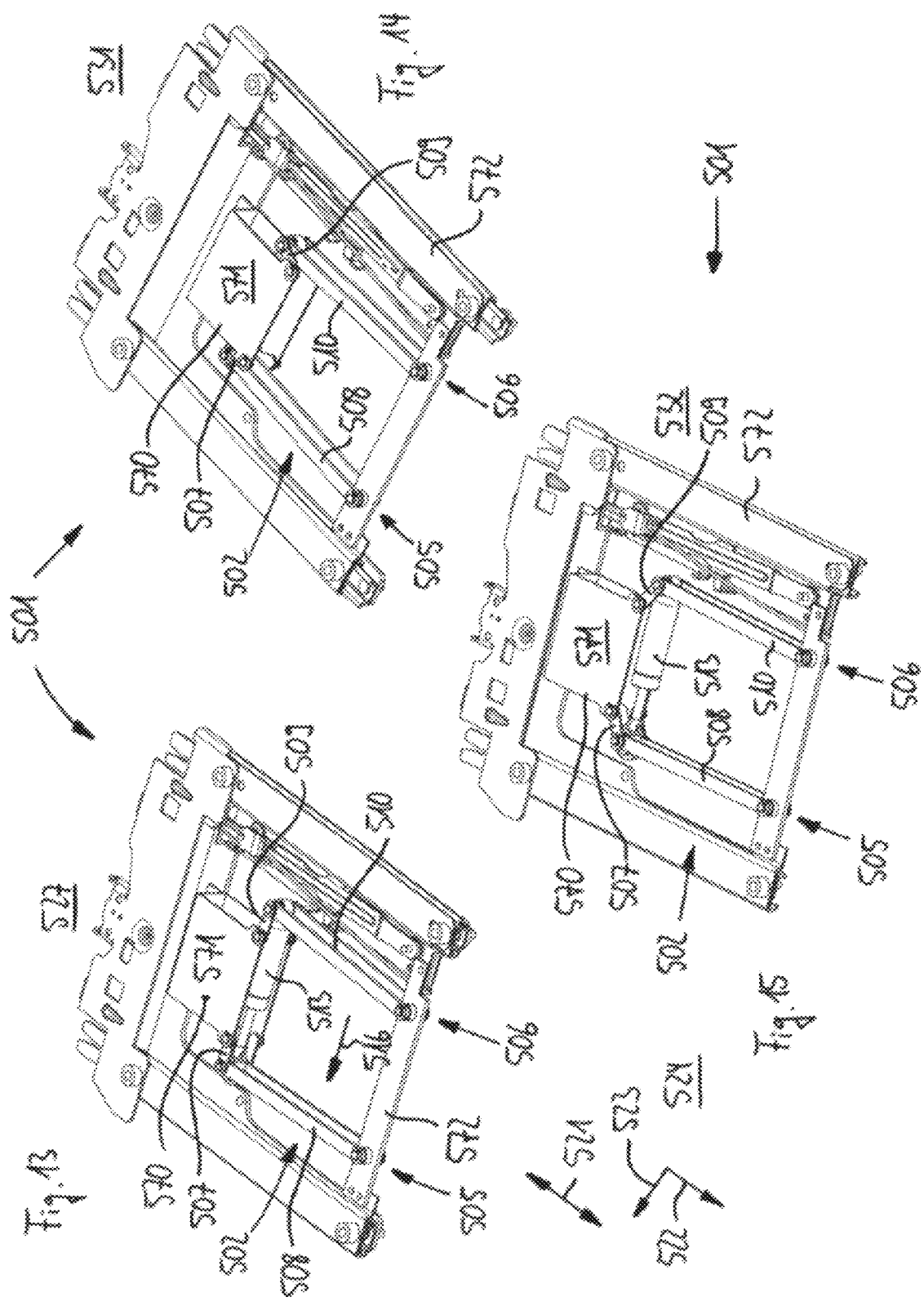

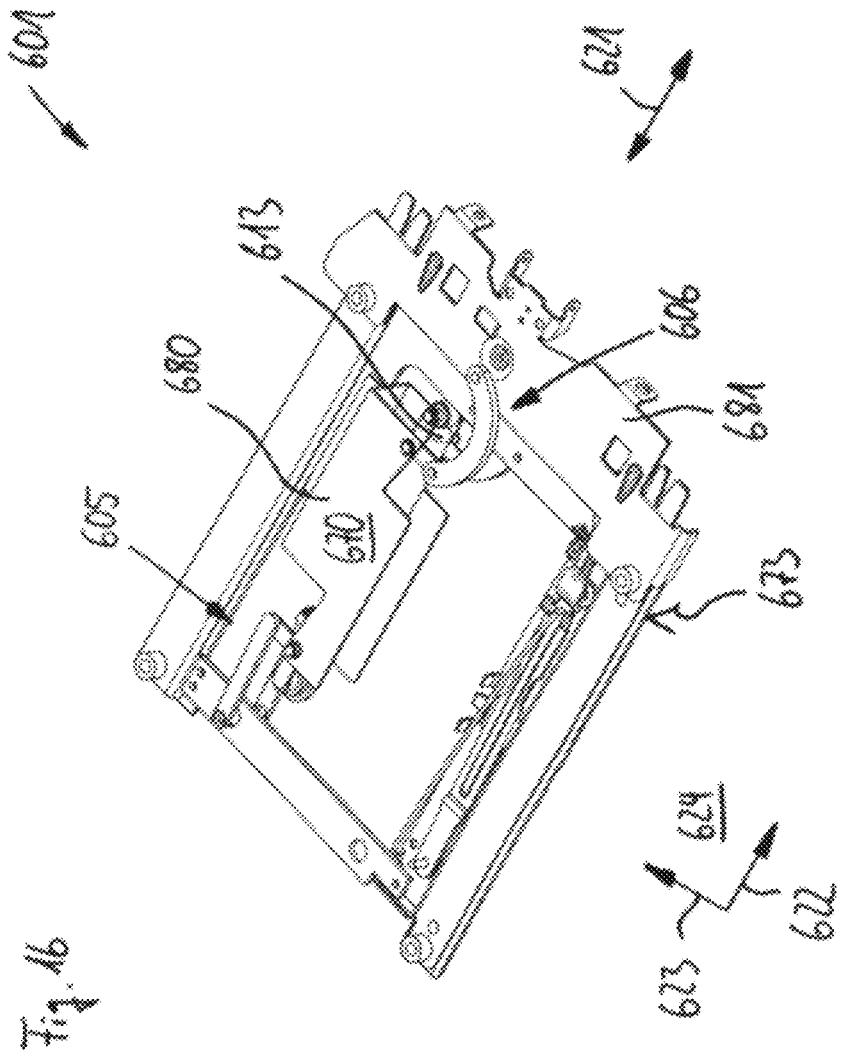

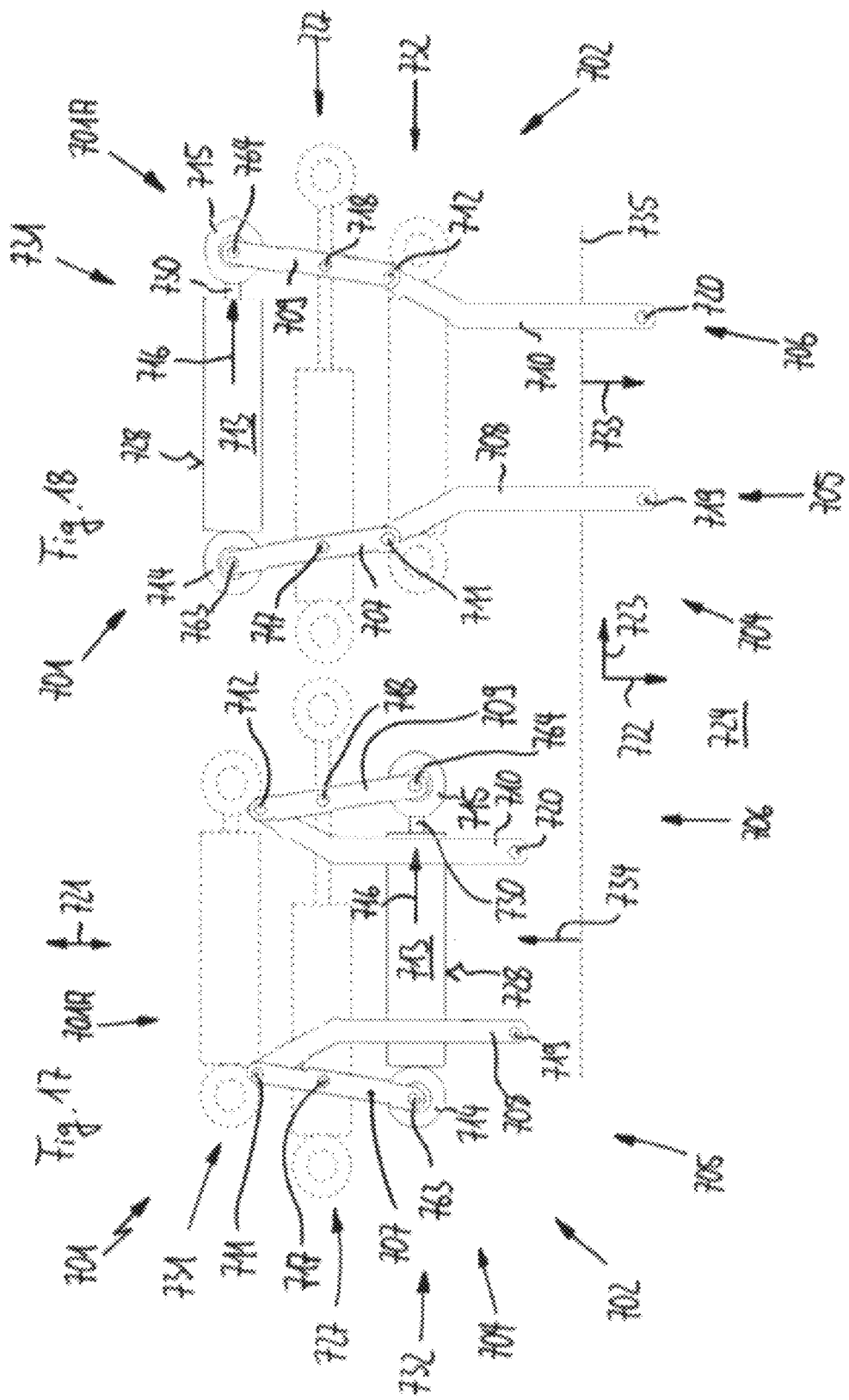

APPARATUS AND METHOD FOR DAMPER ADJUSTMENTS FOR A HORIZONTAL SUSPENSION

PRIORITY CLAIM

This application claims the benefit of German Application Serial No. 102011013122.1 filed on Mar. 4, 2011, contents of which are incorporated herein.

FIELD OF THE INVENTION

The invention relates to a vehicle oscillation device with two vehicle parts arranged to be movable relative to each other, wherein one of the two vehicle parts is supported in a substantially horizontally oscillatory manner in relation to the other one of the two vehicle parts in the longitudinal direction of the vehicle and/or in the width direction of the vehicle.

In addition, the invention relates to a method for positioning a vehicle part of a vehicle oscillation device, which is capable of substantially horizontal oscillations, in a resting position or respectively into the resting position, and use related thereto.

BACKGROUND OF THE INVENTION

Generic vehicle oscillation devices are used in particular on vehicle seats and/or passenger compartments or vehicle cabins which are supported in a horizontally oscillatory manner. Such vehicle oscillation devices connect a bottom part on the vehicle side in a horizontally resilient manner with a top part facing the vehicle seat or the passenger compartment, so that the top part can swing for example forwards in relation to the bottom part, in particular upon excitation into horizontal oscillations. As a result, the horizontal oscillation of the top part can be absorbed resiliently. Such a horizontal oscillation can be initiated for example when a vehicle drives over unevenness on the road. In order to control also vertically initiated oscillations, separate vertical suspension units may additionally be provided on the vehicle oscillation device in a cumulative manner, which will however not be discussed here any further.

A disadvantage in conventional vehicle oscillation devices is that the initiated horizontal oscillations are dampened only to a negligibly minor degree. As a result, a critical oscillating motion of the top part that is capable of horizontal oscillations may build up if a horizontal suspension unit of the vehicle oscillation device has a correspondingly high spring force. However, if the spring force is designed to be too low, there is a risk that the top part that is capable of horizontal oscillations impacts against end stops of the horizontal suspension unit and as a result stops here in an abrupt manner. Both effects are undesirable.

The present invention is directed to remedy the disadvantages of such vehicle oscillation devices.

SUMMARY OF THE INVENTION

The present invention is directed to a vehicle oscillation device having two vehicle parts which are arranged to be movable relative to each other, wherein one of the two vehicle parts is supported in a substantially horizontally oscillatory manner relative to the other one of the two vehicle parts in the longitudinal direction of the vehicle and/or in the width direction of the vehicle, wherein said vehicle oscillation device is characterised in that the two vehicle parts are coupled to each other in a pivoting manner by a transmission system having more than one transmission element, and a damper is provided in a damping manner between a first transmission element and one of the two vehicle parts or a further transmission element. The transmission system used is preferably implemented as a lever assembly.

Since according to the invention the present transmission system is provided, which is preferably designed in a simple and robust manner as a lever assembly, it can be achieved in an advantageous manner that the two vehicle parts are coupled with each other in such a way that the damper can be integrated in the vehicle oscillation device in a particularly space-saving manner. In this way, any horizontal oscillations of the vehicle part that is capable of horizontal oscillations can now be dampened to a degree that is higher than the standard known so far. This is particularly advantageous in relation to a vehicle seat, because it can now be designed to keep dimensions that are similar to those of conventional vehicle seats without damping.

The "vehicle parts" may, in terms of the invention, on the one hand be direct functional components of a vehicle. With regard to a vehicle seat, the vehicle part that is capable of horizontal oscillations may be a top part of a vehicle seat frame or the like and the further one of the two vehicle part may be a bottom part of the vehicle seat frame. It may also be a vehicle seat for a vehicle, in particular a motor vehicle. Alternatively, the invention may embody a passenger compartment or a vehicle cabin of a vehicle, in particular a motor vehicle. In this respect, the vehicle part that is capable of horizontal oscillations may be implemented as a cabin floor. The further one of the two vehicle parts may in this context for example be a body of the vehicle.

The present "vehicle parts" may also embody receptacles for direct functional components of a vehicle, which are provided on the vehicle oscillation device. For example, such receptacles are realised as pivot bearing units. In particular in the case of heavy working machinery such as tractors which are often driven over rough terrain, the vehicle oscillation device on which the invention is based affords substantial advantages because it considerably enhances the comfort in particular for the driver of the vehicle.

It is to be noted here that both the longitudinal direction of the vehicle and the width direction of the vehicle may be horizontal oscillation directions for the vehicle part that is capable of substantially horizontal oscillations.

In respect of a further aspect of the invention, a method for dampening an oscillation of a vehicle part that is capable of substantially horizontal oscillations in a vehicle oscillation device is disclosed, wherein the vehicle part that is capable of horizontal oscillations can oscillate relative to a connected further vehicle part out of a resting position and between first deflected positions and second deflected positions, and wherein the oscillation of the vehicle part that is capable of substantially horizontal oscillations is dampened by means of a damper, with the oscillatory motion of the vehicle part that is capable of substantially horizontal oscillations out of the resting position always being dampened by a compression action of the damper and the motion into the resting position always being dampened by a rebound action of the damper. As a result, a lower dampening power can advantageously always act here on the return into the resting position in a constructively particularly simple manner, so that an oscillation coupling can be reduced or a corresponding isolation effect can be enhanced.

It will be understood that the transmission system can be provided in a variety of ways. However, if the transmission system has an oscillating slider with two transmission elements connected in series, it may be realised in a constructively very simple and compact manner. If the oscillating slider is coupled by means of the damper with one of the two vehicle parts, preferably with the vehicle part that is capable of substantially horizontal oscillations, good damping parameters can already be achieved.

A favoured embodiment variant provides for the transmission system to have two oscillating sliders connected in parallel, each having two transmission elements connected in series, said two oscillating sliders being connected in parallel being coupled with each other by means of the damper. Advantageously, if such a design is selected, any laterally acting forces may act in opposite directions and can therefore be symmetrically introduced into a longitudinal guide system of the vehicle oscillation device.

Moreover it can be ensured in an advantageous manner that no or only negligible rotational accelerations will occur in the damper. In addition, in the variant with just one oscillating slider, damper paths of approximately just half the size and damper speeds of approximately just half the size can be achieved.

Preferably, the transmission elements of an oscillating slider can be articulated together in a linkage, and the damper is supported in this linkage. As a result, a particularly space-saving connection design of the components involved may be achieved.

It will be understood that the same or similar advantages may be achieved on the vehicle oscillation device if lever assemblies of different types are used. In the present case, also the most varied damper types may be used, provided a sufficient horizontal damping can be achieved on the vehicle oscillation device.

The space requirements of the present vehicle oscillation device may be advantageously reduced even further if the damper has a spring component for providing a pushing force. Preferably, the damper used includes a gas spring. Alternatively, mechanical springs may be provided on the damper instead of such a gas spring.

By means of the present transmission system, the damper and gas spring properties may be inverted in an advantageous manner so that the compression phase of the damper can act during the respective deflection motion of the vehicle part that is capable of substantially horizontal oscillations and the rebound phase can act on the respective return motion. If a damper with a corresponding pushing force is used, a separate spring unit for returning the vehicle part that is capable of horizontal oscillations into the resting position may be completely dispensed with. This is essentially due to the fact that because of its particular transmission system design, the damper is compressed against its pushing force in the case of a deflection of the vehicle part that is capable of horizontal oscillations. In this respect, the pushing force of the gas spring integrated in the damper acts as a return force for positioning the damper in the resting position.

In the light of this aspect, a method for positioning a vehicle part that is capable of substantially horizontal oscillations in a vehicle oscillation device in a resting position or into the resting position is disclosed, wherein a spring component of a damper of the vehicle oscillation device holds the vehicle part that is capable of substantially horizontal oscillations in the resting position or moves back the deflected vehicle part that is capable of substantially horizontal oscillations into the resting position. This advantageous approach allows the corresponding vehicle part to be positioned in a particularly effective manner in relation to its resting position.

The present invention uses a damper for holding a vehicle part that is capable of horizontal oscillations in a vehicle oscillation device in a resting position or for levelling the vehicle part that is capable of horizontal oscillations into this resting position, because such a new way of utilising the vehicle oscillation device can be realised with fewer components. Preferably, a corresponding external suspension device may be dispensed with.

In addition or as an alternative, a spring component of a damper is disclosed for retaining a vehicle part that is capable of horizontal oscillations in a vehicle oscillation device in a resting position or for levelling the vehicle part that is capable of horizontal oscillations into this resting position. In this respect, the present vehicle oscillation device includes means for returning the vehicle part that is capable of substantially horizontal oscillations, which means are provided by the damper. Even such return means by themselves constitute an advantageous development of conventional vehicle oscillation devices.

In respect of its longitudinal extension, the damper is preferably arranged in a substantially horizontal manner in or to a plane formed by the longitudinal direction of the vehicle and the width direction of the vehicle so that the damper can be integrated into the vehicle oscillation device in a particularly flat design. If the damper is always orientated transversely to the oscillation direction thereof both in a resting position and in a deflected position of the vehicle part that is capable of horizontal oscillations, the required installation space can be reduced extremely well in precisely this oscillation direction. Alternatively, due to other space requirements the damper may be installed along the oscillation direction or at an angle to the oscillation direction. It is also possible for the damper to be arranged at any other angle between the longitudinal direction, i.e. the oscillation direction, and the transverse direction. Such an angled arrangement of the damper will also be shown below as an example and will be described like the arrangement possibilities longitudinally or transversely to an oscillation direction. Moreover, the damper may also be supported in a pivoting manner, so that an original position angle of the damper changes during the operation of the damper.

BRIEF DESCRIPTION OF THE DRAWINGS

Further advantages and expediencies of the present invention will become evident from the description given below in connection with the drawings which show various top views of vehicle oscillation devices that are implemented in various manners, wherein:

FIG. 1 shows a schematic view of a first embodiment example of a vehicle oscillation device having a transmission system implemented as a lever assembly, comprising two oscillating sliders connected in parallel and a damper arranged transversely in a resting position;

FIG. 2 shows a schematic view of the vehicle oscillation device from FIG. 1 in one of the first or front deflected positions;

FIG. 3 shows a schematic view of the vehicle oscillation device from FIGS. 1 and 2 in one of the two or rear deflected positions respectively;

FIG. 4 shows a schematic view for visualising differently adjusted spring and damper characteristics by displacing pivot bearings on a vehicle oscillation device;

FIG. 5 shows a schematic view of a diagram with different characteristics in respect of offset pivot bearings;

FIG. 6 shows a schematic view of a further embodiment example of a vehicle oscillation device having a transmission implemented as a lever assembly, comprising two alternative oscillating sliders connected in parallel and a longitudinally arranged damper in a resting position;

FIG. 7 shows a schematic view of the vehicle oscillation device from FIG. 6 in one of the first deflected positions;

FIG. 8 shows a schematic view of the vehicle oscillation device from FIGS. 6 and 7 in one of the second deflected positions;

FIG. 10 shows a schematic view of another embodiment example of a vehicle oscillation device having a transmission system implemented as a further lever assembly, comprising a single oscillating slider and a damper in a resting position;

FIG. 11 shows a schematic view of the vehicle oscillation device from FIG. 10 in one of the first deflected positions;

FIG. 12 shows a schematic view of the vehicle oscillation device from FIGS. 10 and 11 in one of the second deflected positions;

FIG. 13 shows a schematic view of a first specific installation example of a vehicle oscillation device according to the invention having a transversely mounted damper on an oscillatingly supported vehicle cabin in a resting position;

FIG. 14 shows a schematic view of the vehicle oscillation device from FIG. 13 in one of the first deflected positions;

FIG. 15 shows a schematic view of the vehicle oscillation device from FIGS. 13 and 14 in one of the second deflected positions;

FIG. 16 shows a schematic view of a second specific installation example of a vehicle oscillation device according to the invention having a longitudinally installed damper on a vehicle seat oscillatingly supported in the resting position;

FIG. 17 shows a schematic view of a vehicle oscillation device having a transmission system comprising straight and angled transmission elements, with a damper being provided between two straight transmission elements in a damping manner; and FIG. 18 shows a further schematic view of the vehicle oscillation device from FIG. 17 in another deflected position.

DETAILED DESCRIPTION OF THE PREFERRED EMBODIMENT

Figure 9:
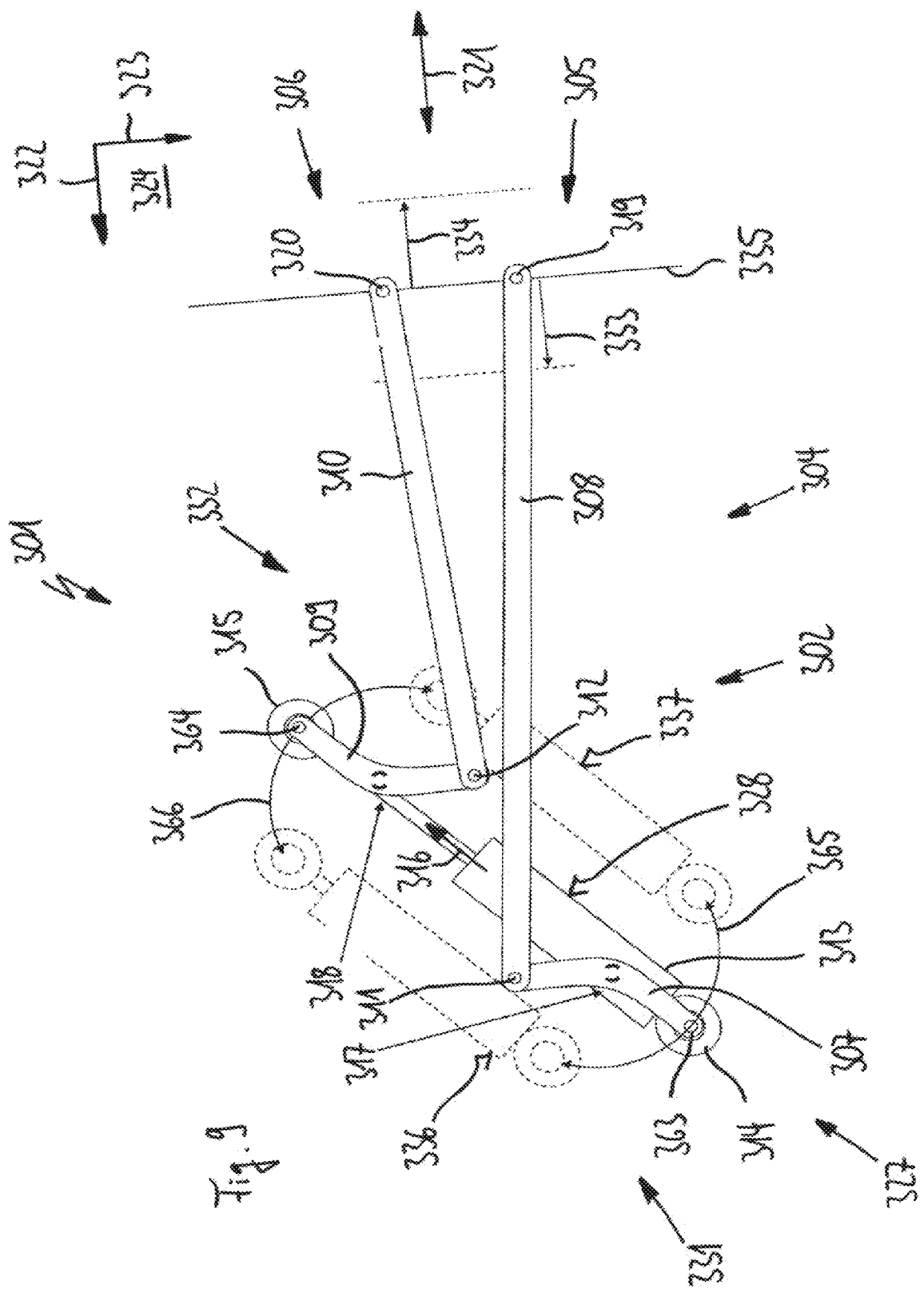
FIG. 9 shows a schematic view of an alternative embodiment example of a vehicle oscillation device having a transmission system implemented as a lever assembly, comprising two alternative oscillating sliders connected in parallel and one obliquely arranged damper in the resting position and in deflected positions.

The view shown in FIG. 1 illustrates the basic principle of a first vehicle damping device 1 according to the invention having a horizontal oscillation unit 1A comprising a transmission system 2 with a plurality of transmission elements 3 which in their entirety form a lever assembly 4.

The lever assembly 4 is preferably made up of two oscillating sliders 5 and 6 connected in parallel. Each of the oscillating sliders 5 and 6 has two transmission elements 7, 8 and 9, 10, respectively, connected in series, which are connected to each other in a pivoting manner by means of linkages 11 and 12, respectively.

In these linkages 11, 12, a damper 13 having an integrated gas spring (here without a reference numeral) is additionally supported on the two oscillating sliders 5 and 6. The support is carried out on the damper side via corresponding annular joints 14 and 15. The integrated gas spring of the damper 13 provides a pushing force 16.

On the two transmission elements 7 and 9, a vehicle part that is capable of horizontal oscillations (not shown here, but see FIGS. 13 to 16) may be attached by means of corresponding receptacles 17 and 18, which are preferably implemented as pivot bearings. Correspondingly, a further vehicle part (not shown here either, but see FIGS. 13 to 16) may be attached to further receptacles 19 and 20, which are preferably also implemented as pivot bearings.

The vehicle part that is capable of horizontal oscillations can oscillate in the oscillation direction 21 according to the arrangement shown. In this embodiment example, the oscillation direction 21 coincides with the longitudinal direction 22 of the vehicle; however, in another embodiment variant it may also be aligned with the width direction 23 of the vehicle. The arrow head of the longitudinal direction 22 of the vehicle points here in the driving direction of a vehicle (not shown), on which the vehicle oscillation device 1 is used.

The arrows in relation to the longitudinal direction 22 of the vehicle or the width direction 23 of the vehicle presently form a plane 24 in which the damper 13 extends in relation to its longitudinal extension.

According to the selected view, the plane 24 coincides with the plane of the paper. Correspondingly, according to this view, the front side 25 of the vehicle is below and the rear side 26 of the vehicle above the damper 13.

In a non-excited vehicle oscillation device 1, in particular the damper 13 is in a resting position 27 which is illustrated in FIG. 1 by a solid line model 28 (see FIGS. 2 and 3, dashed). In this resting position 27, the two transmission elements 7 and 9 are aligned with the housing 29 and with the pushrod 30 of the damper 13, respectively, as a result of which the two further transmission elements 8 and 10 are positioned laterally outwardly therefrom.

In a vehicle oscillation device 1 that has been excited into oscillation, the damper 13 can swing backwards and forwards for example between a front deflected position 31 and a rear deflected position 32. Corresponding deflection paths or spring paths 33 and 34, respectively, are shown by way of example on the first or left-hand oscillating slider 5 respectively. These deflection paths 33 and 34, respectively, are shown in FIGS. 2 and 3 also in relation to a fictitious zero line position 35 that is schematically shown therein. An oscillation excitation may be initiated for example if a vehicle drives over unevenness on the road. The excited oscillation is dampened by the damper 13, so that no critical oscillation build-up can occur.

When oscillating into the front deflected position 31 (see also FIG. 2), the two oscillating sliders 5 and 6 extend in the oscillation direction 21, so that the respective transmission elements 7, 8 and 9, 10 are almost in alignment with each other. In this connection, the compression phase of the damper 13 acts. In addition, the pushrod 29 is retracted into the housing 30 against the pushing force 16.

When oscillating back out of the front deflected position 31, the damper 13 moves back towards the resting position 27. Here, a softer rebound phase of the damper 13 acts as a rule. As a result, an oscillation coupling is advantageously reduced or an oscillation isolation effect is enhanced respectively.

After the passage through the resting position 27 into the rear deflected position 32, the compression phase of the damper 13 acts again, and during the return motion towards the resting position 27, the rebound phase of the damper 13 acts again.

In the rear deflected position 32, the transmission elements 7, 8 and 9, 10, respectively, are again substantially folded together, as a result of which the oscillating sliders 5 and 6 (see FIG. 3) can become shorter.

The horizontal oscillation behaviour of the vehicle oscillation device 1 as explained here has been shown and described essentially in respect of the illustrated damper 13. It will be understood that correspondingly also the further components of the transmission system 2, in particular also the vehicle component that is capable of horizontal oscillations, will also move or oscillate.

According to FIG. 1, the two deflected positions 31 and 32 are illustrated by means of dashed line models 36 and 37, respectively, with a front deflected position 31 being shown in FIG. 2 as a solid line model 28, so that the respective positions in particular of the transmission elements 7, 8 and 9, 10 are easy to see. The same applies with regard to the illustration according to FIG. 3, in which the rear deflected position 32 is shown as a solid line model 28. Preferably, the damper 13 will always be displaced into or retained in its resting position 27 by means of its pushing force 16, so that no additional springs are needed for this purpose. This does not only have a positive effect on the space requirements of the vehicle oscillation device 1, but also on the respective assembly and maintenance operations.

The vehicle oscillation device 101 shown in FIG. 4 has a similar transmission system design to the vehicle oscillation device 1 from FIGS. 1 to 3. In so far, only the essential components will be described in this respect, in order to avoid repetition.

The vehicle oscillation device 101 comprises a transmission system 102 having two oscillating sliders 105 and 106. Each of the oscillating sliders 105 and 106 includes two transmission elements 107, 108 and 109, 110, respectively, connected in series, which are respectively connected to each other in a pivoting manner by a linkage 111 or 112. A damper 113 is supported in these linkages 111 and 112. The damper 113 comprises an integrated gas spring which provides a pushing force 116.

In addition, receptacles 117 and 118 in the form of pivot bearings for receiving a vehicle part (not shown here) that is capable of horizontal oscillations are provided on the transmission elements 107 and 108. Corresponding receptacles 119 and 120, respectively, for a further vehicle part are provided on the transmission elements 109 and 110.

By offsetting the pivot bearings 117 and 118 in height 140—see in this respect the different positions of the two transmission elements 107 and 108 with the short arm lengths S1 and S2, respectively, in respect of the left-hand side 141 and the right-hand side 142—and by adapting exactly these two short arm lengths S1 and S2, the progression of the acting spring and damper characteristics may be advantageously adjusted for existing spring paths (not shown herein).

In the diagram 145 shown in FIG. 5, characteristics 146, 147, 148 and 149 in respect of the offset pivot bearings 117 or 118 (see FIG. 4) are illustrated, wherein the abscissa 150 shows the damper travel in millimeters (mm) and the ordinate 151 shows on the left-hand side a pushing force 116 in Newton (N) of the damper 113 or respectively the gas spring thereof and on the right-hand side a speed ratio in relation to a damper path and a spring path.

The characteristic 146 is the spring characteristic of the vehicle oscillation device 101, which has a very flat region around the zero position 135 and does not rise in any significant way until a damper path in excess of +/−12 mm has been reached. In so far, this construction allows a high level of sitting comfort.

The characteristic 147 is the overall force line of the damper 113 and illustrates clearly that the overall force is very low around the zero position 135 and does not show an extreme rise until damper paths in excess of +/−20 mm have been reached. In this way, a relatively large comfort zone can be achieved.

The characteristic 148 characterises the possible damper path of the damper 113. To the right of the zero position 135, the damper path is approximately +30 mm, until the damper 113 stops in its fully extended position. Accordingly, also the overall force line 147 rises sharply just before it reaches the end stop. To the left of the zero position 135 at approximately −25 mm, the damper 113 is retracted to its maximum extent and the overall force line 147 rises sharply in the opposite direction.

The characteristic 149 indicates the speed ratio in relation to the damper/spring paths when the vehicle oscillation device 101 is in operation. The speed ratio is approximately zero at around the zero position 135. The vehicle oscillation device 101 is substantially in its resting position. When the vehicle oscillation device 101 is in operation and the damper 113 is correspondingly extended or retracted, the speed ratio will rise in correspondence with the damper actuation with the opposite sign, until the damper 113 reaches its respective end position and stops there for a moment. In these two end positions of +30 mm or −25 mm, the damper speed drops back down to zero. In this respect, the speed ratio in relation to the damper/spring paths will also drop back down to zero, as is illustrated by characteristic 149. In these end positions, the seat is deflected either towards the front or towards the rear.

Altogether, the individual characteristics 146, 147, 148 and 149 demonstrate advantages of the present invention, including that by deliberately offsetting pivot bearings on the vehicle oscillation devices, the spring characteristic 146 can be advantageously varied or adjusted in respect of its progression.

The further embodiment example shown in FIGS. 6 to 8 shows another vehicle oscillation device 201 in a resting position 227 (see FIG. 6), in a front deflected position 231 (see FIG. 7) and in a rear deflected position 232 (see FIG. 8). The vehicle oscillation device 201 comprises a transmission system 202 in which a damper 213 is installed longitudinally—which means it is orientated in its longitudinal extension in the oscillation direction 221—in the vehicle oscillation device 201.

The transmission system 202 also comprises two oscillating sliders 205 and 206. The oscillating slider 205 is substantially implemented by two transmission elements 207 and 208 which in this embodiment example, contrary to the previous embodiment examples of FIGS. 1, 2, 3 and 4, are bent to be bow shaped. The two transmission elements 207 and 208 are pivotably connected to each other by a first linkage 211. The oscillating slider 206 is characterised by two transmission elements 209 and 210 that are coupled with each other in a linkage 212.

On the two transmission elements 207 and 209, receptacles 217 and 218 in the form of pivot bearings are respectively provided for attaching a vehicle part (not shown here) that is capable of horizontal oscillations. The pivot bearings 217, 218 are disposed in the area of bending points 260 and 261, respectively, of the transmission elements 207 and 209.

In order to fasten a further vehicle part (not shown here) to the vehicle oscillation device 201, the transmission elements 208 and 210 are equipped with corresponding receptacles 219 and 220. The receptacles 219 and 220 are also provided in the shape of pivot bearings, however, respectively in an end region 262 (only partly has a reference numeral here) of the transmission elements 208 and 210, which faces away from the transmission elements 207 or 209.

The longitudinally mounted damper 213 is preferably connected in a pivoting manner to the transmission element 207 by means of a first annular joint 214 in a bearing 263 of said transmission element 207 in respect of the first oscillating slider 205. The damper 213 is mechanically connected to the second oscillating slider 206 via a further annular joint 215.

To this end, a bearing 264 is provided on the transmission element 208. Moreover, the damper 213 also includes an integrated gas spring by means of which a pushrod 230 is moved out of a damper housing 229 by a pushing force 216.

On the right-hand side of the illustration, a zero-line position 235 is schematically shown, from which onwards a front deflection path or spring path 233 (FIG. 7) and a rear deflection path or spring path 234 (FIG. 8) are schematically shown.

According to the view shown in FIG. 6, two circular arc lines 265 and 266 are schematically shown in particular with regard to the two bearings 263 and 264, which illustrate how far especially the damper 213 oscillates around the resting position 227.

The longitudinal direction 222 of the vehicle, which coincides with the oscillation direction 221, and the width direction 223 of the vehicle, form the plane 224 in which the damper 213 is positioned in its longitudinal extension.

In the view shown in FIG. 6 to 7, the front side 225 of the vehicle oscillation device 201 is correspondingly on the left and the rear side 226 on the right side of the view.

In the vehicle oscillation device 301 shown in FIG. 9, a damper 313 is provided at an angle to the longitudinal direction 322 or the width direction 323 of a vehicle respectively (not shown here) and in a plane 324 formed by these. The angled installation is suitable for solutions in which, due to unfavourable space conditions, the damper 313 can for example either not be integrated at all or only in an awkward manner transversely or longitudinally in the vehicle oscillation device 301. The damper 313 acts between two oscillating sliders 305 and 306 of a transmission system 302 which, as before, is again implemented as a lever assembly 304.

The oscillating slider 305 is substantially made up of two transmission elements 307 and 308 which are connected in a linkage 311, with the shorter transmission element 307 being slightly bent in order to adapt the transmission system kinematics to the oblique installation of the damper 313. Correspondingly, the oscillating slider 306 has two transmission elements 309 and 310 which are connected to a linkage 312 in an articulated manner. Here, too, the shorter transmission element 309 is slightly bent. Annular joints 314 and 315, respectively, of the damper 313 are supported in bearings 363 and 364 at the ends of the two transmission elements 307 and 309.

A left-hand circular arc 365 and a right-hand circular arc 366 indicate how in particular the damper 313 oscillates between a front deflected position 331 and a rear deflected position 332 and in the course of this oscillates past the resting position 327 of the vehicle oscillation device 301. In its resting position 327, the vehicle oscillation device 301 is shown as a solid line model 328, and in the two deflected positions 331 and 332, it is shown as a dashed line model 336 and 337, respectively. In this embodiment example, the vehicle oscillation device 301 is advantageously leveled out in its resting position 327 by means of a pushing force 316 of the damper 313.

A vehicle part (not shown) that is capable of horizontal oscillations is fastened to the transmission elements 307 and 308 by means of receptacles 317 and 318, whereas a further vehicle part (not shown) may be fastened to the transmission elements 308 and 310 by means of receptacles 319 and 320. Here, too, the receptacles 317, 318, 319 and 320 are implemented as pivot bearings.

The vehicle part that is capable of horizontal oscillations can oscillate in the oscillation direction 321, with a front deflection or spring path 333 and a rear deflection or spring path 334 being schematically shown in respect of a fictitiously indicated zero-line position 335.

The further vehicle oscillation device 401 shown in FIGS. 10 to 12 is shown in a resting position 427 (see FIG. 10), in a front deflected position 431 (see FIG. 11) and in a rear deflected position 432 (see FIG. 12). The vehicle oscillation device 401 preferably has a transmission system 402 in which a damper 412 is installed longitudinally—which means orientated with its longitudinal extension in the oscillation direction 421—in the vehicle oscillation device 401. Unlike the previous embodiment examples, however, the transmission system 402 has a lever assembly 404 with just one single oscillating slider 405, which however is again made up of two transmission elements 407 and 408. The latter are connected to each other by a linkage 411 in a pivoting manner.

A vehicle component (not shown here) that is capable of horizontal oscillations is fastened to the vehicle oscillation device 401 via the receptacles 417 and 418 which are implemented as pivot bearings, with this receptacle 417 being provided this time immediately on an annular joint 414 of the damper 413. The receptacle 418 is again associated with the shorter transmission element 407, which is connected to the damper 413 via an annular joint 415.

The vehicle part that is capable of horizontal oscillations can oscillate in the oscillation direction 421 by means of the vehicle oscillation device 401. Whilst the vehicle part that is capable of horizontal oscillations oscillates with a front deflection or spring path 433 and a rear deflection or spring path 434 between a front deflected position 431 and a rear deflected position 432 around a fictitiously indicated zero-line position 435, the annular joint 415 pivots in particular along a circular arc line 466 in a plane 424 formed by the longitudinal direction 422 of the vehicle and the width direction 423 of the vehicle.

As in the embodiment examples described above, the vehicle oscillation device 401 will advantageously stabilise itself in the resting position 427 due to the pushing force 416 of the damper 413. To this end, the damper 413 is provided with a gas spring (not shown).

A further vehicle part for the vehicle oscillation device 401 is fastened to a single receptacle 419 which is mounted in the end region 462 of the transmission element 408.

The transmission of the acting forces of the damper 413 to the deflection or spring path 434 can be advantageously modified in particular over the length of the angled transmission elements 407 and 408. By the way, this also applies to the other embodiment examples having angled transmission elements.

Further, one of the angled transmission elements 407 and 408 may be matched to the deflection or spring path 434 of the damper 413; the other one of the angled transmission elements 407 and 408 can be designed for correcting the transfer.

The vehicle oscillation device 501 shown in FIGS. 13 to 15 has a vehicle part 570 that is capable of horizontal oscillations, which in this particular installation example is implemented as a cabin floor area 571 of a vehicle cabin (not shown) of a vehicle indicated here only by a body component 572. According to the invention, the body component 572 is in this particular installation example a further vehicle part 573 of the vehicle oscillation device 501, to which the vehicle part 570 that is capable of horizontal oscillations is supported in an oscillatory manner.

In this respect, the cabin floor area 571 is supported in an oscillatory manner relative to the body component 572 in the oscillation direction 521 (see in particular FIG. 13), with the vehicle oscillation device 501 being shown in the resting position 527 in the view of FIG. 13, in a front deflected position 531 in the view of FIG. 14 and in a rear deflection position 532 in the view of FIG. 15. Thus, the oscillation direction 521 is aligned with the longitudinal direction 522 of the vehicle and extends transversely to the width direction 523 of the vehicle.

In one embodiment, the vehicle oscillation device 501 comprises a transmission system 502 with two oscillating sliders 505 and 506 connected in parallel, between which, according to the invention, a damper 513 acts with a pushing force 516. The oscillating sliders 505, 506 are implemented as a lever assembly 504 comprising transmission elements 507, 508 and 509, 510, respectively. Here too, the damper 510 is arranged in a space-saving manner in a plane 524 formed by the longitudinal direction 522 of the vehicle and the width direction 523 of the vehicle. Apart from that, the design of the vehicle oscillation device 501 corresponds in particular to the design of the vehicle oscillation device 1 from FIG. 1 to 3. In so far, reference is made to the corresponding description, in order to avoid repetition.

A further particular application example of a vehicle oscillation device 601 is shown in FIG. 16. This relates to a vehicle seat of a motor vehicle, in particular a tractor, in which a top seat part 680 as the vehicle part 670 that is capable of horizontal oscillations can oscillate relative to a bottom seat part 681 as a further vehicle part 673 in an oscillation direction 621. In this example, the oscillation direction 621 coincides with the longitudinal direction 622 of the vehicle and is arranged transversely to the width direction 623 of the vehicle.

The vehicle oscillation device 601 comprises a transmission system 602 with two oscillating sliders 605 and 606, between which a damper 613 that is mounted longitudinally to the oscillation direction 621 acts in a manner that was previously described several times. Both the damper 613 and the transmission system 602 are again located and act in a plane 624 formed by the longitudinal direction 622 of the vehicle and the width direction 623 of the vehicle.

The further vehicle oscillation device 701 shown in FIGS. 17 and 18 comprises a horizontal oscillation device 701A with a transmission system 702, which comprises a lever assembly 704 of straight transmission elements 707, 709 and of angled or curved transmission elements 708 and 710. The straight transmission element 707 and the angled transmission element 708 form a first oscillating slider 705. A second oscillating slider 706 is correspondingly made up of a straight transmission element 709 and the angled transmission element 710.

The transmission elements 707 and 708 are connected in series and are connected to each other in a pivoting manner via a pivoting linkage 711. The transmission elements 709 and 710 are also connected in series and are connected to each other in a pivoting manner via a pivoting linkage 712.

The straight transmission element 707 comprises a bearing 763 that supports a first annular joint 714 of the damper 713. A second annular joint 715 of the damper 713 is supported in a bearing 764 of the other straight transmission element 709. In this way the damper 713 can act in a damping manner between the first oscillating slider 705 and the second oscillating slider 706.

The pivoting linkage 711 and the bearing 763 are here located at opposite ends of the straight transmission element 707, and the pivoting linkage 712 and the bearing 746 are located at opposite ends of the straight transmission element 709. In between, a receptacle 717 and 718, respectively, in the form of a pivot bearing for attachment to a vehicle part (not shown here) that is capable of horizontal oscillations is provided.

In particular owing to the design of the straight transmission elements 707 and 709 for example with respect to their lengths, the placement of their receptacles 717 and 718, their pivoting linkages 711 and 712 and their bearings 763 and 764 as well as, as the result of the distance ratios resulting therefrom, the transmission ratio of the vehicle oscillation device 701 can be adjusted in a variety of ways. Especially longer transmission elements 707, 709 do not allow an excessive extension or retraction of the damper 713 or a respective pushrod 730, so that in this way a softer tuning of the vehicle oscillation device 701 can be achieved in a constructively simple manner.

The non-straight transmission elements 708 and 710 have a further receptacle 719 and 720, respectively, at the arm ends that are opposite to the pivoting linkages 711 and 712, respectively, on which—as also in the other embodiment examples—a further vehicle part (not shown here) may be fastened.

In this embodiment example, too, the damper 713 is orientated substantially transversely to an oscillation direction 721 of the vehicle oscillation device 701 and in a plane 724 formed by a longitudinal direction 722 of the vehicle and a width direction 723 of the vehicle. In this way, the damper 713 is integrated in the vehicle oscillation device 701 in a very flat manner. The vehicle oscillation device 701 in one example will oscillate around a zero line position 735.

According to the view shown in FIG. 17, the vehicle oscillation device 701 is shown in a rear deflected position 732 with a deflection path or spring path 734, in which the damper 713 is shown as a solid line model 728. The damper 713 is respectively schematically indicated as a dashed line model additionally allusively in a resting position 727 and in a front deflected position 731.

According to the view shown in FIG. 18, the vehicle oscillation device 701 is shown in the front deflected position 731, in which the damper 713 is indicated as a solid line model 728. Correspondingly, the damper 713 is respectively illustrated as a dashed line model in the resting position 727 and in the rear deflected position 732 of the vehicle oscillation device 701.

In the resting position 727, the pushrod 730 is extended because of a pushing force 716 of a gas spring (not shown here) of the damper 713, as a result of which the vehicle oscillation device 701 can be retained in this resting position 727.

If, however, a stronger oscillation excitation occurs, the vehicle oscillation device 701 or respectively, specifically, the vehicle part (not shown here) that is capable of horizontal oscillations, oscillates backwards and forwards between front and rear deflected positions 731 and 732, so that the pushrod 730 is again and again pushed into the damper 713 against the pushing force 716.

Whilst the damper unit of the damper 713 dampens the oscillations by means of a rebound or compression action, the pushing force 716 of a spring unit of the damper 713 pushes the vehicle oscillation device 701 repeatedly into the resting position 727, until the vehicle oscillation device 701 can level itself off again into this resting position 727.

Thus, a particularly compact damper-spring unit is realised on the vehicle oscillation device 701.

All of the features disclosed in the application documents are claimed as being essential to the invention in as far as they are new and inventive over the prior art either individually or in combination.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An oscillation device for use with a vehicle, comprising:
   first and second members arranged to be movable relative to each other, wherein the first member is supported in a substantially horizontally oscillatory manner in relation to the second member in at least one of the longitudinal direction of the vehicle or in the width direction of the vehicle; and
   a transmission system having a first transmission element and a damper,
   wherein the first and second members are coupled with each other in a pivoting manner by the transmission system and the damper is configured between the first transmission element and at least one of the first or second members or between the first transmission element and a second transmission element;
   wherein the transmission system further comprises a third transmission element;
   wherein the first and third transmission elements are connected in series and configured as a first oscillating slider of the transmission system; and
   wherein the first oscillating slider is coupled to at least one of the first and second members by the damper.

2. The vehicle oscillation device of claim 1, wherein the first oscillating slider is coupled to the first member capable of substantially horizontal oscillations by the damper.

3. The vehicle oscillation device of claim 1, wherein
   the transmission system further comprises a second oscillating slider having third and fourth transmission elements connected in series; and
   the first and second oscillating sliders are coupled with each other by means of the damper.

4. The vehicle oscillation device of claim 1, wherein the first and second transmission elements of the first oscillating slider are connected to each other in a pivoting manner by a linkage and the damper is supported in the linkage.

5. The vehicle oscillation device of claim 1, wherein the damper comprises a spring component for providing a pushing force.

6. The vehicle oscillation device of claim 1, wherein the damper is arranged in respect of its longitudinal extension substantially horizontally in relation to a plane formed by the longitudinal direction of the vehicle and the width direction of the vehicle.

7. The vehicle oscillation device of claim 1, wherein the damper is orientated transversely to an oscillation direction of the first member capable of substantially horizontal oscillations in the resting position and in deflected position.

8. The vehicle oscillation device of claim 1, wherein at least one of the first or second members arranged to be movable relative to each other form part of a vehicle seat.

9. The vehicle oscillation device of claim 1, wherein at least one of the first or second members arranged to be movable relative to each other form part of a passenger compartment of a vehicle.

10. The vehicle oscillation device of claim 1, wherein at least one of the first or second members arranged to be movable relative to each other form part of a vehicle cabin.

11. A vehicle oscillation device for use with a vehicle, comprising:
    first and second members arranged to be movable relative to each other, wherein the first member is supported in a substantially horizontally oscillatory manner in relation to the second member in at least one of the longitudinal direction of the vehicle or in the width direction of the vehicle; and
    a transmission system having at least one oscillating slider and a damper,
    wherein the first and second members are coupled with each other in a pivoting manner by the transmission system and the damper is configured between the at least one oscillating slider and the first or second member;
    wherein the transmission system further comprises a second oscillating slider; and
    wherein the first and second oscillating sliders are coupled with each other by means of the damper.

12. An oscillation device for use with a vehicle, comprising:
    first and second members arranged to be movable relative to each other, wherein the first member is supported in a substantially horizontally oscillatory manner in relation to the second member in at least one of the longitudinal direction of the vehicle or in the width direction of the vehicle; and
    first and second links each pivotally coupled to the first member;
    third and fourth links each pivotally coupled to the second member, the first link being pivotally coupled to the third link at a first pivot and the second link being pivotally coupled to the fourth link at a second pivot; and
    a damping member pivotally coupled at one end to the first pivot and coupled at a second end to the second pivot.

* * * * *